United States Patent Office 3,629,396
Patented Dec. 21, 1971

3,629,396
AVIAN ENCEPHALOMYELITIS VACCINE
Vance J. Yates, Kingston, R.I., and Lawrence O. Mancini, White Plains, N.Y., assignors to University of Rhode Island, Kingston, R.I.
No Drawing. Filed Apr. 30, 1969, Ser. No. 820,653
Int. Cl. C12k 5/00, 7/00
U.S. Cl. 424—89 15 Claims

ABSTRACT OF THE DISCLOSURE

Avian encephalomyelitis vaccine is a high titer suspensian propagated in chicken embryo cell cultures.

BACKGROUND OF THE INVENTION

This invention relates to a new method of propagating avian encephalomyelities (AE) virus and vaccines prepared from the propagated AE virus cultures.

Avian encephalomyelities, also known as epidemic tremor, is an infectious disorder which is prevalent among various species of poultry and affects particularly chickens and pheasants. The disease has been recognize since 1930 and manifests itself by ataxia and a tremor of the head and neck of the afflicted animal and often causes high mortality in affected flocks. In laying hens the infection causes a temporary decline in egg production estimated at up to 20–25%.

Histopathological evidence shows that the primary site of the infection in younger birds is the brain from which a pathogenic factor may be isolated. Massive focalization of the virus also appear in the proventriculus. From there it grows throughout the intestinal tract and is shed through the droppingss which are the main source of contamination and spread of the disease.

The widespread occurrence of this epiornithic poses a major problem for the poultry raising industry. Statistical findings in the United States and Canada show an insidence of the infection as high as 55% of the flocks at the start of lay, and of 93% at the conclusion of the production period. Mortality of freshly hatched chicks may amount to 100%. Losses in terms of culls and blindness at the undiagnosed subinfective level and as a result of a temporary fall in egg production contribute to an additional depreciation of the flocks.

The causative agent of avian encephalomyelitis obtained from flocks in the field was first successfully propagated by Jones in susceptible chicks by intracerebral inoculation (Jour. Exper, Med. 59:781). AE virus cultures were also produced from artificially infected and embryonated eggs (Van Roekel et al. Vet. Med. 34:754 and Jour. Am. Vet. Med. Assn. 99:220) and from maitland type cultures of minced whole embryo tissue in the presence of chick serum (Kligler et al. Proc. Soc. Exp. Biol. and Med. 43:680).

The identification and isolation of the etiological organism of avian encephalomyelitis has stimulated considerable research toward the preparation of a suitable immunizing agent against this disease. Prophylactic vaccination has been effected with brain- and embryo-adapted strains of the virus. When used by the wing-web and intramuscular route, however, these vaccines were too virulent and produced ataxia, paralysis and even fatal incidents in varying percentages of birds. Oral vaccination with these strains proved to be impractical since they had a low immunogenic potency and therefore required excessive concentration. Slightly embryo-attenuated material appeared to be more promising for oral vaccination during the pre-laying period after the parental immunity was gone. Its disadvantage, however, lay in the fact that because of the parental immunity the birds were not fully protected until the age of 6–8 weeks. Likewise, killed virus cultures were used, but with unsatisfactory results.

We have found a most economical and convenient method by which a highly immunogenic AE vaccine without undesirable virulent reactions can be prepared.

SUMMARY OF THE INVENTION

This invention relates to a novel method of propagating avian encephalomyelitis virus having a titer of sufficient dosage to infect 50% of the tested embryos ($EID_{50}$) comprising the steps of preparing a stock inoculum containing the virus, passing the inoculum into a chick embryo cell culture capable of inducing and sustaining the growth of the virus, and harvesting the virus from the culture after about four days subsequent to inoculation.

The invention further relates to an avian encephalomyelitis vaccine containing a stabilizing medium and the harvested virus collected at periodic intervals during the propagation period, the harvested virus having an $EID_{50}$ titer of at least $10^{2.3}$.

DESCRIPTION OF THE PRODUCTS AND METHOD

The first step of the method for propagating AE virus comprises preparing a stock inoculum containing the virus. A seed virus is used to prepare the stock inoculum, which virus may be typified by the Van Roekel strain of avian encephalomyelitis identified as Conn. Strain A 37020, which is deposited at and is available from the Department of Animal Diseases, University of Connecticut, Storrs.

The stock inoculum is prepared by inoculation embryonated eggs with the seed virus. The inoculated eggs are incubated until adequate growth i.e. titer of $10^{2.3}$ or above, is obtained. Virus containing components of the embryos are then macerated and suspended in a suitable menstrum such as tryptose phosphate broth. The suspension is separated into two parts, a supernatant liquid suspension containing the virus and the sediment consisting of tissue fragments and cellular components. The supernatant liquid forms the stock inoculum and generally has a titer ranging from about $10^{2.3}$ to $10^{7.5}$ embryo infective $dose_{50}$ ($EID_{50}$) per milliliter (ml.) and preferably $10^{6.0}$ to $10^{7.5}$. High titer material is desirable, i.e. between $10^{6.0}$ to $10^{7.5}$, to insure sufficient active virus for inoculation of the cell cultures.

The second step of the method for propagating AE virus comprises inoculating a chick embryo cell culture capable of inducing and sustaining the growth of the virus with the stock inoculum. The culture is prepared from tissue of chicken embryos free from AE antibodies.

Generally, the heads of the embryos are removed aseptically and the torsos are minced. The resulting suspension is then washed several times with an isotonic solution preferably buffered to a pH of about 7.0 to 7.6. The washed suspension is then washed with a proteolytic enzyme solution such as 0.25% trypsin solution and subsequently trypsinized at room temperature.

The trypsinized suspension is shaken and filtered and the filtrate subjected to sedimentation. The supernatant liquid is discarded and the packed cells are resuspended in a conventional nutrient medium fortified with serum. A number of conventional nutrient media may be used. Ref.: Proc. Soc. Exp. Biol. Med., 73:1 (1950). Growth, 15:11 (1951). Proc. Soc. Exp. Biol. Med., 74:22 (1950). Proc. Soc. Exp. Biol. Med., 78:880 (1951). J. Cell. & Comp. Physiol., 36:411 (1950). J. Am. Med. Assn., 151:1081 (1953). The fortified nutrient medium suspension is adjusted to neutral pH range of about 7.0 to about 7.6 with a weak basic solution such as 0.75% sodium bicarbonate solution.

The neutralized suspension is then used to inoculate containers for culturing the stock virus of step 1. The inoculated containers are incubated at a temperature of about 37° C. for three days, after which the fortified nutrient medium is replaced by a maintenance medium void of the serum. During this incubation period, the chick embryo cellular conglomerate of the suspension form confluent sheets within the container, the sheets being predominately formed of fibroblast cells. This is explained by the fact that the fibroblast cells of the cellular conglomerate grow more rapidly than do the cells of the internal organs, whereby the fibroblast cells overgrow the other cells.

Four days subsequent to the initial seeding of the containers, the cultures are inoculated with the stock inoculum of step 1. The inoculum is diluted in an isotonic solution, preferably containing a buffer. The virus is adsorbed from the solution to the cell sheets and the cell culture is washed with the isotonic solution.

The isotonic solution is discarded and replaced with a maintenance nutrient medium as hereinbefore described. The culture is then reincubated for a desired interval, preferably about 24 hours, for propagation purposes. The culture is harvested periodically from the fourth day following inoculation until an inadequate $EID_{50}$ titer, i.e. less than 2.3, is obtained. Generally, the culture is harvested from the fourth to about the twenty-fifth day, however, it is preferred to harvest the culture from the seventh through the sixteenth day since a higher titer is obtainable during this period.

Unlike most viruses, AE virus does not show an increased $EID_{50}$ titer within the first 24 to 72 hours after inoculation of cell cultures. However, the $EID_{50}$ titer of the AE virus culture exhibits a sharp increase on or about the fourth day subsequent to inoculation and this high titer is maintained until about the 16th to the 25th day when the cell cultures begin to disintegrate.

The third step of the method of propagating AE virus comprises the collecting of the high titer virus from the culture. The collecting step generally comprises harvesting the virus containing culture fluids and washing the cultures with the isotonic solution as hereinbefore described subsequent to each harvest or collection. The isotonic solution is then replaced with the maintenance nutrient medium, as hereinbefore described, and the culture is reincubated. After incubating for the desired interval, the culture is again collected, and the washing and replacing steps are repeated.

As illustrated by the foregoing description, the propagation of avian encephalomyelitis virus in chick embryo fibroblasts prepared from a chick cellular conglomerate represents the first successful effort of cultivating the organism in vitro under commercially workable conditions. The cell tissue culture induces and supports the growth of the virus for a relatively long period such that a harvest of the virus having a high $EID_{50}$ titer can be collected periodically from the same tissue culture over a period of two to three weeks while under present commercial practice, only one harvest can be obtained from a culture, after which the system must be discarded.

The technique is relatively inexpensive in that fewer personnel are required to manage the operation and only a few embryos are necessary to generate the propagation process. The harvesting procedure is greatly simplified and more expedient than under the practice used hereinbefore. Further, the culture system is also substantially free from extraneous protein and thereby greatly reduces the possibility of contamination with other microorganisms such as bacteria and fungi.

The harvested virus cultures having an $EID_{50}$ titer of at least $10^{2.3}$, and generally from $10^{2.3}$ to about $10^{7.0}$ are converted to a vaccine by mixing the cultures in a stabilizing medium. A typical stabilizing medium may consist of a mixture of sterile proteinaceous material such as skim milk, gelatin, or serum and sterile polyhydric alcohols, such as glycerin or sorbitol. The virus cultures are added to the proteinaceous material and the polyhydric alcohol is then added to the virus-protein mixture such that the final mixture contains a ratio of 1:1:2 of each of the respective components.

It has been found that the vaccine exhibits an effective immunological response and is adaptable for use by at least three different methods of administration. The first method comprises a forced oral administration wherein up to one ml. of the prepared vaccine is given orally by means of a pipette or syringe to an individual chicken. With this method, only a few birds of a flock receive the vaccine per se. The subjected birds become infected, spread the virus and infect the remaining birds. It is understood that in the above instance, infect is synonymous with vaccinate.

The second method of administration of the vaccine includes administering the vaccine to susceptible birds through their drinking water. In this method, approximately 12 grams of water stabilizer of proteinaceous material, such as skim milk, is added to approximately 2 gallons of tap water. A 5 ml. batch of the vaccine representing approximately 500 doses having an $EID_{50}$ titer of at least $10^{2.3}$ is added to the water mixture, which is then thoroughly mixed. The mixture is then substituted for the birds drinking water, with the quantity dispersed dependent upon the size of the flock. Generally, it is preferred that the mixture be prorated on the basis of approximately 12.2 to about 18.2 ml. per bird.

The third method of administering the vaccine is by the wing-stab method. In this method, a commercially available 2-prong applicator adapted for this method of administration, is dipped into the prepared vaccine solution. The web of one wing of a chicken is then stabbed with the vaccine contaminated prongs and the bird is thereby infected.

The commercial vaccine, as hereinbefore described, finds utility in effectively immunizing susceptible birds to avian encephalomyelitis or epidemic tremor. The vaccine is adaptable for administration by at least three different methods of administration. Further, tissue cell culture propagated vaccine is relatively void of extraneous matter capable of sustaining disease organisms. The vaccine is concentrated such that a small quantity can effectively immunize a large number of susceptible birds and may be conveniently stored. Also, the necessary stabilizing medium incorporated in the vaccine is conventional and relatively cheap.

The following examples serve to illustrate specific preferred embodiments of this invention and utility and are not intended to be limiting.

Example I.—Preparation of the avian encephalomyelitis virus culture

The seed virus used in the experiments was the Van Roekel strain of avian encephalomyelitis identified as Conn. Strain A 37020 on deposit at and available from the Department of Animal Diseases, University of Connecticut, Storrs. The virus was passed three times in 6–7 day old embryonated chicken eggs by inoculation into the allantoic sac. The eggs were then incubated at 37° C. for 11 days. Following the incubation period, the brains of these embryos were removed and macerated and made into a suspension of 10% in a tryptose phosphate broth. The suspension was then subjected to low-speed centrifuga and the supernatant liquid was withdrawn and held as a stock virus. The titer of the supernatant liquid was tested by the titration mehtod in chicken embryos and found to possess an $EID_{50}$ of $10^{6.5}$/ml.

To prepare the cellular tissue culture, six 11-day old chicken embryos, free from AE antibodies, were used. The heads of the embryos were removed and the torsos thereof were minced with sterile instruments. The resulting mash was washed several times with a phosphate-buffered saline solution, once with 1.25% trypsin and then trypsinized at room temperature for 1 hour. The resulting suspension was thereupon shaken for approximately 10 seconds and filtered through 12 layers of gauze. The filtrate, containing the tissue cells, was then subjected to sedimentation at 285×G for 11 minutes. Each milliliter of packed cells was resuspended in 350 ml. of a liquid nutrient medium (medium 199) fortified with 8% inactivated calf serum in the presence of 100 units of penicillin G and 100 micrograms of streptomycin per 1 ml. A 0.75% solution of sodium bicarbonate was used to adjust the suspension to a pH of 7.0–7.2.

Ten three-ounce prescription bottles were then seeded with 10 ml. of the cell tissue suspension and incubated at 370 C. for three days. The fortified nutrient medium was then replaced by a maintenance medium without calf serum and the seeded bottles were reincubated at 37° C. In the first four days of the incubation period, the chick conglomerate cellular tissue forms confluent sheets within the bottles, of which fibroblast cells predominate.

Four days subsequent to initial seeding, five bottles were inoculated with 0.3 ml. of a 1:10 dilution of the stock virus in a phosphate-buffered saline solution. The virus was permitted to be adsorbed to the cellular sheets for a period of three hours, whereupon the cell cultures were washed with 10 ml. of phosphate-buffered saline solution. The latter was discarded and 10 ml. of the maintenance medium was introduced.

Five bottles of the tissue culture were used as controls. To each of the five bottles, 0.3 ml. of a virus free phosphate-buffered saline solution was added and the controls were treated in a manner identical to that of the test cultures.

Fluids from the virus-infected system were collected and pooled daily from the first through the seventh day and thereafter preferably tridaily through the 22nd day when further growth of the culture ceased and the titer declined to an ineffectual level. The control cultures were processed in the same fashion. After each collection of fluids, all the cultures were washed with 10 ml. of phosphate-buffered saline solution which was discarded before replenishment with 10 ml. of maintenance medium.

Each harvest sample of the AE infected cell culture was titrated in 7-day old embryonated chicken eggs. Ten-fold serial dilutions were made of each harvest and each dilution was injected in the yolk sac of 4 eggs by using an inoculum of 0.1 ml. per embryo. Supernates from the control bottles were inoculated in a similar manner. After 13 days of incubation, all embryos were examined for signs of AE involvement. The endpoint of the infection was determined in accordance with the method of Reed et al. (Am. J. Hyg. 27:493–497, 1938). The results obtained from the titrations are presented in Table I.

TABLE I.—EID$_{50}$ OF FLUIDS HARVESTED FROM AE INFECTED CHICK TISSUE CULTURES

Days after infection on which culture fluids were harvested [a]

| | 1 | 2 | 3 | 4 | 5 | 6 | 7 | 8 | 9 |
|---|---|---|---|---|---|---|---|---|---|
| Infected culture [b] | 1.5 | 1.3 | 1.2 | 3.2 | 2.6 | 4.0 | 2.9 | 4.5 | 5.0 |

| | 10 | 12 | 13 | 14 | 16 | 19 | 22 | 25 |
|---|---|---|---|---|---|---|---|---|
| Infected culture | 3.3 | 3.5 | 3.0 | 4.2 | 3.8 | 2.7 | 2.3 | 1.6 |

[a] Media from all cell sheets replaced after each harvest.
[b] Titer EID$_{50}$/ml.

No cytopathic effects were observed throughout the viral proliferation in the tissue culture system and no agar overlay plaques developed over the entire 25 day period.

To test the virulence of the harvested tissue culture, a serum neutralization test was performed. Avian encephalomyelitis antiserum was prepared in the following manner. A rabbit was first intravenously inoculated with 1 ml. of a virus suspension and subsequently infected with 6 ml. of virus stock combined with 2 ml. of 4% sodium alginate adjuvant by intramuscular injection. The latter treatment was hebdomadally repeated for a period of 8 successive weeks whereupon the animal was bled one week following the last injection. The serum was separated and inactivated at 56° C. for 30 minutes. The neutralization titer of the serum read $10^{3.7}$.

The serum neutralization test was carried out by mixing the undiluted antiserum with an equal amount of individual harvests of infected tissue culture collected on the days specified in Table I. The mixture was allowed to react at room temperature for one hour. Second aliquots of the same supernates were diluted in a ratio of 1:2 with phosphate-buffered saline liquid and kept at room temperature for one hour. Control fluids from uninoculated infected tissue culture were thawed and immediately used for the test in undiluted state.

0.1 ml. of all three preparations were then injected into the yoke sac of 7-day old embryonated chicken eggs, with 4 eggs being used for each of the harvested specimens involved. Eight embryonated eggs were kept as untreated controls without inoculation. The eggs were examined on the 20th day for histopathological involvements and the results are recorded on the following Table II.

TABLE II.—YOLK-SAC INOCULATIONS OF 7-DAY OLD EMBRYONATED EGGS WITH INFECTED TISSUE CULTURE FLUIDS REACTED WITH ANTISERUM

Days after infection on which CEF fluids were harvested

| Inoculum | 1 | 2 | 3 | 4 | 5 | 6 | 7 | 10 | 13 | 16 | 19 | 22 | 25 |
|---|---|---|---|---|---|---|---|---|---|---|---|---|---|
| Infected fluid and saline [a] | [b] 1/4 | 1/4 | 2/4 | 4/4 | 4/4 | 4/4 | 4/4 | 4/4 | 4/4 | 4/4 | 3/3 | 3/4 | 2/3 |
| Infected fluid and antiserum [c] | 0/4 | 0/4 | 0/4 | 1/4 | 0/4 | 0/4 | 1/4 | 1/4 | 1/4 | 0/4 | 0/3 | 0/4 | 0/4 |
| Uninoculated CEF fluid (undiluted) | 0/4 | 0/4 | 0/4 | 0/4 | 0/4 | 0/4 | 0/4 | 0/4 | 0/4 | 0/4 | 0/4 | 0/4 | 0/4 |
| Uninoculated embryonated eggs | | | | | All 8 embryos were normal | | | | | | | | |

[a] Ratio of infected fluid to saline 1:2.
[b] Number of embryos with AE involvement/number of embryonated eggs used.
[c] Ratio of infected fluid to antiserum 1:1.

These data showed that 40 out of 50 eggs inoculated with infected tissue culture fluids manifested typical avian encephalomyelitis involvements whereas only 4 out of 51 test animals exposed to the antiserum-AE culture mixture showed signs of the infection in terms of a slight twisting of the toes. The 40 embryos receiving the non-neutralized infectious culture partly succumbed and partly were affected with muscular dystrophy. All embryos from eggs inoculated with non-infected tissue culture fluids remained normal as did the specimens from uninoculated eggs.

Example II.—Preparation of the vaccine

Equal quantities of tissue culture harvest fluids collected 7 and 8 days after infection were pooled and then mixed with an equal quantity of sterile milk, after which two volumes of sterile glycerin were added and the whole was thoroughly mixed. The mixture was made in accordance with the following formula:

| | Ml. |
|---|---|
| 7-day fluids | [1] 4 |
| 8-day fluids | [1] 4 |
| Skim milk | 8 |
| Glycerin | 16 |
| Total | 32 |

[1] Pooled.

The mixture was divided into 5 ml. batches and dispersed into vials. Each 5 ml. vial was arbitrarily designated as representing 500 doses of vaccine. The vaccine was stored at −20° C.

(A) Drinking water efficiency test.—To test the efficiency of the vaccine, 9½ week old chickens were vaccinated with the vaccine. The birds were first reared in strict isolation and serum withdrawn before vaccination was negative to avian encephalomyelitis.

The vaccine was reconstituted by dissolving 500 doses in a mixture of 12 grams of a skim milk water stabilizer and 2 gallons of tap water. The 500 doses or 5 ml. vial of vaccine was added to the mixture and thoroughly mixed. This vaccine containing water preparation was then prorated so that 1 dose or 15.2 ml. of the preparation was allotted to each bird.

The chickens to be vaccinated were given the vaccine as drinking water and were given no other water until the vaccine was consumed. These chickens, together with a suitable number of controls, were kept in strict isolation for 33 days and bled. The blood serum of these birds were tested for seriological responses in accordance with the method of Calnek et al. described in Avian Diseases, 1959, pp. 95–104 and 225–239. A serum neutralization index (NI) of 1.1 is indicative of effective field immunity. The NI of the tested chickens are illustrated in Table III.

TABLE III

| Sera from vaccinated birds | | Prevaccination sera | | Sera from controls | |
| --- | --- | --- | --- | --- | --- |
| #1 | 1.5 | 1 | 0.4 | 1 | 0.6 |
| #2 | 1.4 | 2 | 0.6 | 2 | 0.8 |
| #3 | 1.3 | | | 3 | −0.2 |
| #4 | 1.2 | | | 4 | +0.7 |
| #5 | 0.8 | | | | |
| #6 | 1.3 | | | | |
| #7 | 0.4 | | | | |
| #8 | 1.0 | | | | |
| #9 | 1.4 | | | | |
| #10 | 1.4 | | | | |

The above chickens, after bleeding, were challenged intracranially with AE virus of high neuropathogenicity. Each chicken was given 1,000 embryo lethal doses $_{50}$ (ELD$_{50}$). The chickens were observed for 17 days after challenge. Birds showing paralysis or other signs of brain damage were scored as being infected and susceptible to this lethal challenge. The results of the test are illustrated in Table IV.

TABLE IV

| | Number infected | Number immune |
| --- | --- | --- |
| Vaccinated birds | 4 | 6 |
| Control birds | 4 | 0 |

This test showed approximately the same proportion of immune chickens as the serum neutralization test above. Immunogenicity of the vaccine can be increased by increasing the dosage given each chicken.

(B) Forced oral administration efficiency test.—In this trial the AE vaccine was given orally. In this test, a large dose of the vaccine is given to only a few birds which become infected, shed the virus in the droppings and infect or vaccinate the remaining birds of the flock.

Three chickens of different ages, one 2½ months old, and two 7½ months old, were selected for the trial. The ages of the chickens are representative of the approximate age extremes when chickens are normally vaccinated.

Each chicken was given 1 ml. of the vaccine orally with a syringe. The test was conducted in Horsfall-Bauer isolation units. A fourth chicken was not treated and was used as a control.

The birds were bled 27 days after vaccination and serum neutralization tests on the sera were conducted according to the method of Calnek as described hereinbefore. The neutralization index for each serum is illustrated in Table V.

TABLE V

Vaccinated birds: NI
 #1 _____ 2.7
 #2 _____ 3.5
 #3 _____ 3.5
Control: NI=0.9.

These serum titers showed the immunogenic effect of the vaccine by oral administration and verified that a higher dose of vaccine results in a higher immunological response.

(C) Wing-stab administration efficiency test.—In this trial, the vaccine was prepared by diluting 1.25 ml. of virus suspension, obtained from the 9th day harvest of the tissue culture, with 1.75 ml. of sterile saline solution.

Five susceptible chickens, 9 weeks old, were vaccinated by wing web stab. A commercial 2 prong applicator was dipped into the vaccine and stabbed through the web of one wing. This procedure was repeated for each chicken. Prior to vaccination, blood serum was obtained from 3 of these birds to confirm that they were susceptible to avian encephalomyelitis.

The birds were held in isolation and observed for 21 days during which time they remained healthy. They were then bled and the blood serum tested for antibodies to avian encephalomyelitis. This test confirmed the immunogenic effect of the vaccine and the results of the test are shown in Table VI.

TABLE VI

| After vaccination | | Prevaccination | |
| --- | --- | --- | --- |
| Bird | NI [1] | Bird | NI |
| 1 | 2.2 | 1 | 0.1 |
| 2 | 2.7 | 2 | 0.3 |
| 3 | 2.5 | 3 | 0.2 |
| 4 | 2.4 | | |
| 5 | 2.2 | | |

[1] An NI of 1.1 or above is indicative of effective immunity.

What we claim is:

1. A method of propagating avian encephalomyelitis virus in vitro comprising the steps of:
   preparing an inoculum containing the avian encephalomyelitis virus;
   inoculating said inoculum into a chick embryo cell culture of which fibroblast cells predominate and which is capable of inducing and sustaining the growth of said virus; and
   collecting said virus from said culture after more than 72 hours have passed following inoculation.

2. A method of propagating avian encephalomyelitis virus as defined in claim 1 wherein said inoculum has a titer ranging from about $10^{2.3}$ EID$_{50}$ per ml. to about $10^{7.5}$ EID$_{50}$ per ml., said inoculum comprising said virus and water.

3. A method of propagating avian encephalomyelitis virus as defined in claim 2 wherein the collecting step serially comprises
   harvesting said virus by removing the supernatant liquids from said culture;
   washing said culture with isotonic liquid; and
   adding a liquid nutrient medium to said culture and repeating periodically the steps of harvesting, washing, and adding a nutrient medium for continuous propagation of said virus in the culture.

4. A method of propagating avian encephalomyelitis virus as defined in claim 3 wherein the harvesting step is initiated when the supernatant liquid has an EID$_{50}$ titer ranging from about $10^{2.3}$ to about $10^{7.0}$.

5. A method of propagating avian encephalomyelitis virus as defined in claim 4 wherein said inoculum is obtained by
   inoculating embryonated chicken eggs with said virus;
   incubating the inoculated eggs;
   preparing a suspension from the embryos and withdrawing the supernatant liquid inoculum.

6. A method of propagating avian encephalomyelitis virus as defined in claim 5 wherein the chick embryo cell culture is obtained by
   preparing a chick embryo cellular conglomerate suspension containing fibroblast cells;

incubating said suspension for at least four days whereby a fibroblast predominate culture is formed.

7. A method of preparing avian encephalomyelitis virus as defined in claim 6 wherein said washing liquid includes a suitable buffer to obtain a pH in said culture of from about 7.0 to about 7.6.

8. A method of preparing avian encephalomyelitis virus as defined in claim 1 wherein the virus-containing fluids are collected between the fourth and the twenty-second day after inoculation of the cell culture.

9. An avian encephalomyelitis vaccine prepared from cultures according to claim 1, comprising the virus containing fluids collected during the propagation period from about the fourth to about the twenty-second day.

10. An avian encephalomyelitis vaccine as defined in claim 9 wherein said virus containing fluids have an $EID_{50}$ titer ranging from about $10^{2.3}$ to about $10^{7.0}$.

11. An avian encephalomyelitis vaccine as defined in claim 10 and wherein said vaccine further comprises a liquid stabilizing medium selected from the group consisting of polyhydric alcohols, proteinaceous materials and a mixture thereof.

12. An avian encephalomyelitis vaccine as defined in claim 11 wherein said polyhydric alcohols are selected from the group consisting of glycerin and sorbital.

13. An avian encephalomyelitis vaccine as defined in claim 11 wherein said proteinaceous materials are selected from the group consisting of skim milk, gelatin and serum.

14. A virus vaccine product for immunizing poultry against epidemic tremor comprising the virus containing fluids prepared in accordance with claim 1 and diluted in a sterile saline solution.

15. An oral virus vaccine product for immunizing poultry against epidemic tremor comprising a mixture of live avian encephalomyelitis virus-containing fluid and an orally ingestible, non-toxic carrier, said fluid having an $EID_{50}$ titer of at least $10^{2.3}$, and being produced in accordance with claim 1.

References Cited

Hwang et al.: PSEBM 102:429–431 (1959), "Synthesis, Cytopathogenicity, and Modification of Avian Encephalomyelitis Virus (AEV) in Chick Kidney Cell Culture."

Andrews: "Viruses of Vertebrates" pp. 21–22 (Avian Encephalomyelitis), 1964, Baltimore, Md., Williams and Wilkins Co.

Vet. Bull. Nos. 35, 628, 2192, 3049, 4614 (1965).

Vet. Bull. Nos. 38, 1434, 3148, 5057 (1968).

Mancini et al.: Avian Diseases, 11:672–9, November 1967, "Cultivation of Avian Encephalomyelitis Virus in Vitro, 1. in Chick Embryo Neuroglial Cell Culture."

Mancini et al.: Avian Diseases, 12:278–284 May 1968, "Cultivation of Avian Encephalomyelitis Virus in Vitro, 2. in Chick Embryo Fibroblastic Cell Culture."

Mancini et al.: Avian Diseases, 12:686–688, November 1968; "Research note—Cultivation of Avian Encephalomyelitis Virus in Chicken Embryo Kidney Cell Culture."

SHEP K. ROSE, Primary Examiner

U.S. Cl. X.R.

195—1.1, 1.7, 1.8